(12) United States Patent
Benson

(10) Patent No.: US 12,497,772 B2
(45) Date of Patent: Dec. 16, 2025

(54) RV WASTE MANAGEMENT SYSTEMS

(71) Applicant: Jeffrey Benson, Sweetwater, TN (US)

(72) Inventor: Jeffrey Benson, Sweetwater, TN (US)

( * ) Notice: Subject to any disclaimer, the term of this patent is extended or adjusted under 35 U.S.C. 154(b) by 72 days.

(21) Appl. No.: 18/225,993

(22) Filed: Jul. 25, 2023

(65) Prior Publication Data

US 2025/0034854 A1    Jan. 30, 2025

(51) Int. Cl.
| | | |
|---|---|---|
| *E03F 1/00* | (2006.01) | |
| *B08B 9/043* | (2006.01) | |
| *B60R 15/00* | (2006.01) | |
| *F16L 11/12* | (2006.01) | |
| *F16L 33/24* | (2006.01) | |
| *F16L 3/01* | (2006.01) | |

(52) U.S. Cl.
CPC ............ *E03F 1/008* (2013.01); *B08B 9/0436* (2013.01); *B60R 15/00* (2013.01); *F16L 11/12* (2013.01); *F16L 33/24* (2013.01); *F16L 3/01* (2013.01)

(58) Field of Classification Search
CPC ... F16L 9/22; F16L 11/12; F16L 33/24; F16L 3/01; E03F 1/008; Y10T 137/6855; B08B 9/0436; B60R 15/00
USPC .............................. 138/120, 155, 177; 285/12
See application file for complete search history.

(56) References Cited

U.S. PATENT DOCUMENTS

| | | | | |
|---|---|---|---|---|
| 4,125,237 A * | 11/1978 | Hagins | .................... | E03F 1/008 248/75 |
| 4,266,813 A * | 5/1981 | Oliver | .................... | F16L 25/14 285/423 |
| 4,650,224 A * | 3/1987 | Smith | ..................... | E03F 1/008 285/376 |
| 5,947,156 A * | 9/1999 | Tomczyk | ................ | E03F 1/008 137/355.16 |
| 6,122,792 A * | 9/2000 | Roy | ..................... | A46B 5/0062 15/164 |
| 11,614,204 B2 * | 3/2023 | Sharp | ..................... | G01M 3/00 73/592 |
| 2007/0144602 A1 * | 6/2007 | Henkin | .................. | E04H 4/1654 138/119 |
| 2007/0235096 A1 | 10/2007 | Nielsen | | |
| 2009/0236001 A1 * | 9/2009 | Damaske | ................ | B60R 15/00 137/899 |
| 2015/0075624 A1 * | 3/2015 | Mahaffa | .................. | F16L 35/00 138/109 |
| 2022/0221096 A1 * | 7/2022 | Wright | ..................... | F16L 39/02 |
| 2024/0116463 A1 * | 4/2024 | Smith | ..................... | F16L 21/06 |

FOREIGN PATENT DOCUMENTS

| | | | | |
|---|---|---|---|---|
| CA | 2265361 A1 * | 9/1999 | ............. | B60R 15/00 |
| FR | 2712371 A1 * | 5/1995 | ............. | E03C 1/122 |

OTHER PUBLICATIONS

Machine Translation of FR27132371 retrieved from espacenet.com Feb. 7, 2025 (Year: 2025).*

* cited by examiner

*Primary Examiner* — Jessica Cahill

(57) ABSTRACT

A recreational vehicle waste delivery system with lengths of 3D cylindrical non-flexible tube and of 3D cylindrical flexible-tube, a first-coupler and, a second-coupler. The first coupler, the at least one flexible-tube, the second-coupler and the at least one flexible-tube in combination are able to be removably couplable modularly in series to provide an adjustable, modular waste management system for delivering waste from an rv to an in-ground sewer connection when engaged with a disposal fitting of the rv.

1 Claim, 5 Drawing Sheets

RV WASTE MANAGEMENT SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71 (d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of piping and more specifically relates to piping for land vehicles.

2. Description of the Related Art

Many individuals drive recreational vehicles (rvs). Some rvs have plumbing so the occupants can use water, and any waste water accumulated needs to be disposed of. Existing hose and pipe systems to release sewer waste from an rv waste tank are typically inexpensive hose that deteriorate very quickly, cannot support themselves off the ground, cannot be cleaned because of the waste being trapped in the expansion joints of the hose therefore breeding disease from the fecal matter in the waste from the rv toilet tank and they are one continuous length up to 20 feet.

These hose systems are very inexpensive and need to be purchased many times throughout the life of the rv and its owners. The hose smells, sometimes harboring toxic substances, some of which can produce foul odors and breed diseases. Overall, it is a very nasty, unsanitary means for removing waste from an rv.

These aforementioned hoses are usually plastic hoses that are flexible with an accordion-style wall structure throughout the entire length of the hose. Some versions are hard plastic and are telescopic to fit different lengths as needed from the rv to the sewer inlet at rv campsites. These are more useful for semi-permanent installations.

Various attempts have been made to solve the above-mentioned problems such as those found in U.S. Pub. Nos. 2007/0235096, 2015/0075624; and U.S. Pat. No. 5,947,156. This art is representative of piping for land vehicles. None of the above inventions and patents, taken either singly or in combination, is seen to describe the invention as claimed.

Ideally, a piping system for land vehicles should provide safe, effective and convenient means for disposing of waste and waste water fluid and, yet would operate reliably and be manufactured at a modest expense. Thus, a need exists for a reliable rv waste management system to avoid the above-mentioned problems.

BRIEF SUMMARY OF THE INVENTION

In view of the foregoing disadvantages inherent in the known piping art, the present invention provides a novel rv waste management system. The general purpose of the present invention, which will be described subsequently in greater detail is to provide a durable, effective and convenient means for disposing of waste from rvs.

A recreational vehicle waste delivery system, as disclosed herein, and in certain embodiments, may comprise: at least one length of 3D cylindrical non-flexible tube and at least one length of 3D cylindrical flexible-tube (typically a plurality of each of non-flexible and flexible so they are reasonably portable, easy to assemble, manipulate and clean) each having a body defined by an outer surface, an inner volume, an inner surface, and a tube-thickness, a first-coupler and; a second-coupler. The first coupler, the at least one flexible-tube, the second-coupler and the at least one flexible-tube in combination are able to be removably couplable modularly in series to provide an adjustable, modular waste management system for delivering waste from an rv to an in-ground sewer connection when engaged with a disposal fitting of the rv; and wherein both of the first-coupler and the second-coupler do not comprise bayonet-style-couplers.

In a preferred embodiment, described herein, the recreational vehicle waste delivery system comprises: at least one length of 3D cylindrical non-flexible tube and at least one length of 3D cylindrical flexible-tube each having a body defined by an outer surface, an inner volume, an inner surface, and a tube-thickness, at least a first-coupler and; at least a second-coupler, wherein the first coupler, the at least one flexible-tube, the second-coupler and the at least one flexible-tube are able to be removably couplable modularly in series to provide an adjustable, modular waste management system for delivering fluid waste from an RV to an in-ground sewer connection when engaged with a disposal fitting of the RV. In this particular embodiment both of the first-coupler and the second-coupler do not comprise bayonet-style-couplers, as in the embodiment previously described.

Instead the first-coupler and the second-coupler preferably comprise threads (other embodiments may comprise other non-threaded coupling means that perform a suitably equivalent function). Threaded coupling means is preferred since it creates a positive connection that is able to be sealed through 360 degrees tight against the next joint and/or seal. In embodiments where the first-coupler and the second-coupler comprise threads they function as threaded connectors (connecting means to the rv and/or in-ground sewer connection as found in campgrounds, parks and the like). When threadingly coupled, the first-coupler and the second-coupler are able to effectively form a 360 degree water-tight seal in use to create a closed system.

The inner surface of the 3D cylindrical non-flexible tube preferably comprises a straight-wall (in relation to the outer surface, forming a diameter), as does the flexible tube, and the inner surface comprises a substantially smooth-wall through the entire length of modularly joined piping, thus designed to minimize friction on fluid flow and so as not to accumulate the fluid waste along the inner surface, a great benefit for users. It can be appreciated that the non-accordian-style wall design doesn't comprise 'collection valleys' along the length of the pipes to accumulate fluid so avoids the problems that come with that profile.

In these versions the at least one length of 3D cylindrical non-flexible tube and the at least one flexible-tube are non-telescopic (in relation to each subsequent pipe or to the pipe itself); wherein the at least one length of 3D cylindrical non-flexible tube and the at least one flexible-tube are at least 3 inches in diameter to allow for suitable volume flow.

The flexible tube may be such as schedule 40 HydroMaxx ultra flexible PVC pipe 3-inch diameter or suitable equivalent; wherein the ribs are integrated into the body of the pipe (tube) and yet allow the inner volume of the pipe to be smooth, not accordion-style (with V-style configuration). The at least one length of 3D cylindrical non-flexible tube and the at least one flexible-tube preferably comprise PVC, ABS, and Polypropylene material and withstand UV (ultraviolet light), freezing and heating as per current ASTM and CISPI standards for longevity in use. Sections of the non-flexible tube may be translucent to allow the user to visually inspect the pipe to see if it is clean or clogged. Further, as designed, the at least one flexible-tube is able to turn 180-degrees when bent and maintain the desired positioning during the use; wherein a user is able to manipulate the modular waste management system to fit an existing outdoor terrain and available connections via user-preferred adjustment.

The present rv waste management system may be sold as kit, as disclosed herein, comprising at least the following parts: at least one length of 3D cylindrical non-flexible tube; at least one length of 3D cylindrical flexible-tube (typically there will be a plurality of both non-flexible and flexible tube pipes); a carrying box; at least one grid framework for inside the carrying box to set the pipes and components upon for rattle-free storage during travel (also reducing any wear on the components and providing breathing room for the components); at least one cleaning brush; and at least one set of user instructions. The grid framework may comprise foam or the like (soft yet sufficiently rigid) material and have cutaways in the material to accommodate fitting the various components neatly and efficiently within the confines of the carrying box. Such cutaways may comprise ½ circles or the like so the pipes etc can have good mountable/carry surface contact yet be accessed with ease when packing and unpacking from the carrying box. Those with ordinary skill in the art will now appreciate that upon reading this specification and by their understanding the art of storage and grid frame as described herein, methods of packing and storing will be understood by those knowledgeable in such art.

A method of using a recreational vehicle waste delivery system is also described which may comprise the steps of: step one providing the recreational vehicle waste delivery system as a kit; step two may comprise assembling and connecting the modular waste management system for delivering waste from the RV to the in-ground sewer connection when engaged with the disposal fitting of the RV, and step three manipulating orientation of the modular waste management system to fit existing outdoor terrain and available connections via user-preferred adjustment; the at least one length of 3D cylindrical non-flexible tube configured and sufficiently rigid to be mounted on at least one stand and the at least one length of 3D cylindrical flexible-tube configured to be formed to serviceably fit to and around the existing outdoor terrain and the available connections.

The method may further comprise the steps of: step four disassembling and cleaning the modular waste management system; components able to be cleaned via a cleaning brush that is 50 inches or less long; and step five storing, once dried, in a carrying box on a grid framework inside the carrying box.

The present invention holds significant improvements and serves as an rv waste management system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, rv waste management system, constructed and operative according to the teachings of the present invention.

The various embodiments of the present invention will hereinafter be described in conjunction with the appended drawings, wherein like designations denote like elements.

DETAILED DESCRIPTION

Figure 1:
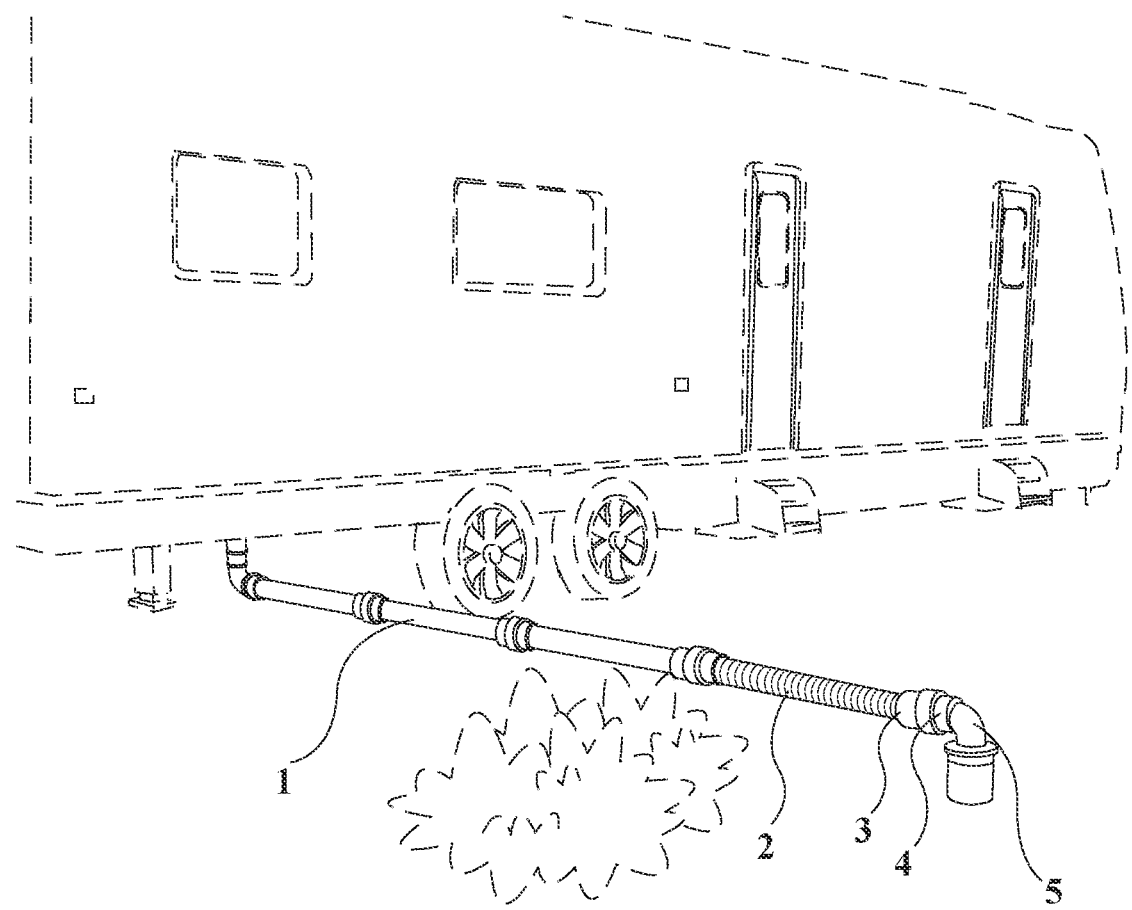
FIG. 1 shows a perspective view illustrating an rv waste management system in an in-use condition according to an embodiment of the present invention.

As discussed above, embodiments of the present invention relate to a piping for land vehicles and more particularly to an rv waste management system as used to improve the efficiency and cleanliness for waste water removal from rvs.

Generally speaking, the present system is comprised of PVC, ABS, and Polypropylene material with a 3' to 4" rigid pipe and flexible pipe with connectors and fittings that are designed to fit an rv waste removal application. Other sizes may be available for other applications. The piping used is preferably the same pipe that is used for underground applications for sewer and waste and meets all ASTM & CISPI standards for UV stabilization, withstanding freezing temperatures and to withstand elevated temperatures as well.

The perfect rv flush system (rv waste management system) is tailored for use with an rv vehicle of virtually any kind. It can be used on a pull-type trailer, fifth wheel, camper, motorhome, and other such rvs. It should be appreciated that it can be used with non-rv applications as well. It is preferably comprised of 3-36" to 48" lengths of rigid pipe and 3-36" to 48" of flexible pipe. These increments of pipe allow the flexible pipe to flex into a 180-degree shape and the rigid pipe allows the system to hover above the ground with no supports whatsoever in many cases. In other cases, an object like a piece of wood or a stand can be placed in the center of the pipe length to support the entire length of pipe above the ground unlike other conventional hose systems that require supports through the entire length of the hose.

Most parks and/or rv campgrounds require that the sewer line is supported above the ground to prevent the hose from rotting which is not a problem with the present invention's design and materials. Conventional systems also require an end piece that seals the sewer pipe drain so that fumes are contained within the sewer system whereas the present invention improvingly seals through 360 degrees joint to joint, to couplers, connectors, etc.

Using these specific lengths in rigid and flexible pipe combinations is a part of what makes this system unique. The user can determine the length of pipe needed by the number used and construct a much stronger structure that has the flexibility it needs to fit any desired length; modularity in design for meeting the desired environment needs or application(s). The system for assembly usually starts from the rv with a connector to the rv pipe and a length of flexible pipe about 36" to 48" in length and then is connected to a rigid pipe of the same length. The rigid pipe used makes the length of pipe, as assembled, sturdier. The flexible pipe is almost as rigid as the rigid pipe allowing it to hover above the ground from the beginning but is flexible enough to turn into a 180-degree position if needed. Using the various combinations of rigid and flexible pipe gives the system much greater strength, versatility, and overall rigidity through the entire length of coupled piping. The connectors between the rigid and flexible pipe are designed to be glued to the end of each pipe with a male and female end piece (collar) that threads into one another making a strong connection that is effectively waterproof and able to be positively sealed. It also provides a smooth inside surface for the waste so the waste sediment and waste fluid does not collect inside the pipe. This feature allows the piping to remain relatively clean during use so as not to deteriorate the pipe and odor is not a factor. At the end of the pipe length once assembled is preferably a 90-degree elbow that inserts into the ground sewer drain and fits to seal the pipe and thus in effect creates a closed system.

The connectors can be a threaded type or what is called a union coupler or virtually any other type of connector or coupler to connect the pipe lengths together to achieve a watertight seal. There is no significant compression on these pipes so they will last in service for many years to come thereby effectively extending the life of the pipe system far beyond the life of existing hose or pipe systems used today. This benefit makes the device cost-effective in use.

Setting up this system to an rv takes about the same amount of time as all the other flexible hoses currently offered and the breakdown is just as fast. The main difference is that by disconnecting the connectors from the rigid and flexible pipes it allows the user to clean the pipe very easily with the cleaning brush provided (in the kit) that is preferably within a range of 38" to 50" long, Using the provided cleaning brush cleans any small collection of waste residue that is left and leaves the pipe clean and sanitary to store in the rv. When cleaned it is ready for use the next time it is needed, all with very little effort expended. Another advantage of the shorter lengths connecting to one another is that it makes it much easier to store in the rv because there is limited room for storage and it requires a reasonably small storage footprint. The carrying case keeps the components all together and organized for the next use.

As to the use of rigid and flexible pipe, in combination, it depends on how far the ground sewer pipe is from the rv pipe. The system can be set up to go around trees, bushes and other objects/obstacles while maintaining a level downward grade with no support or little support. The waste fluid flows more easily (friction minimized between the fluid and the inner wall) with a smooth inside surface as opposed to accordion style hoses or piping of conventional systems. The present invention, by design, is highly improved over conventional systems.

Figure 3:
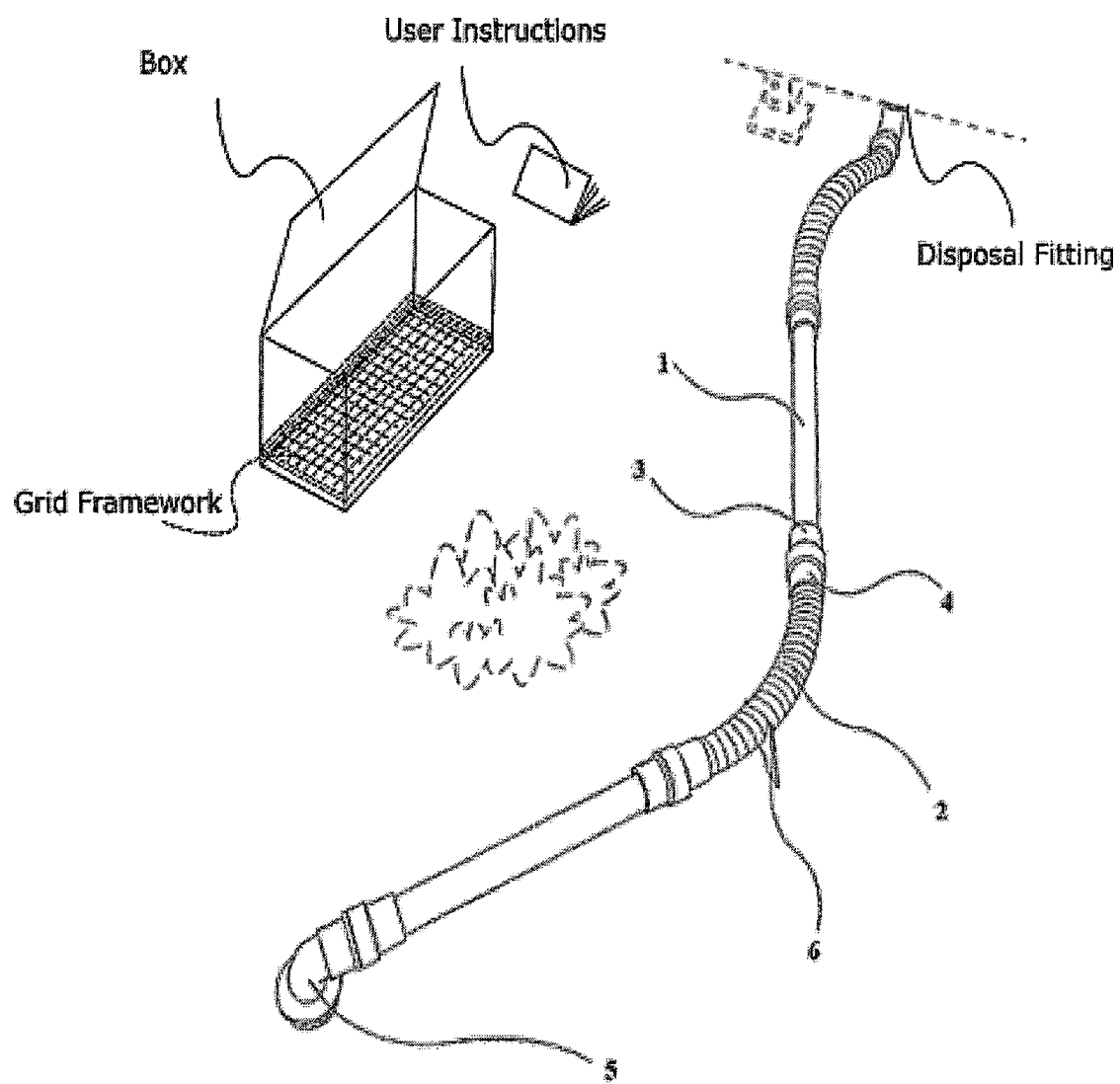
FIG. 3 is a perspective view illustrating the rv waste management system in an yet another in-use condition (modular configuration) according to an embodiment of the present invention of FIG. 1.
Figure 4:
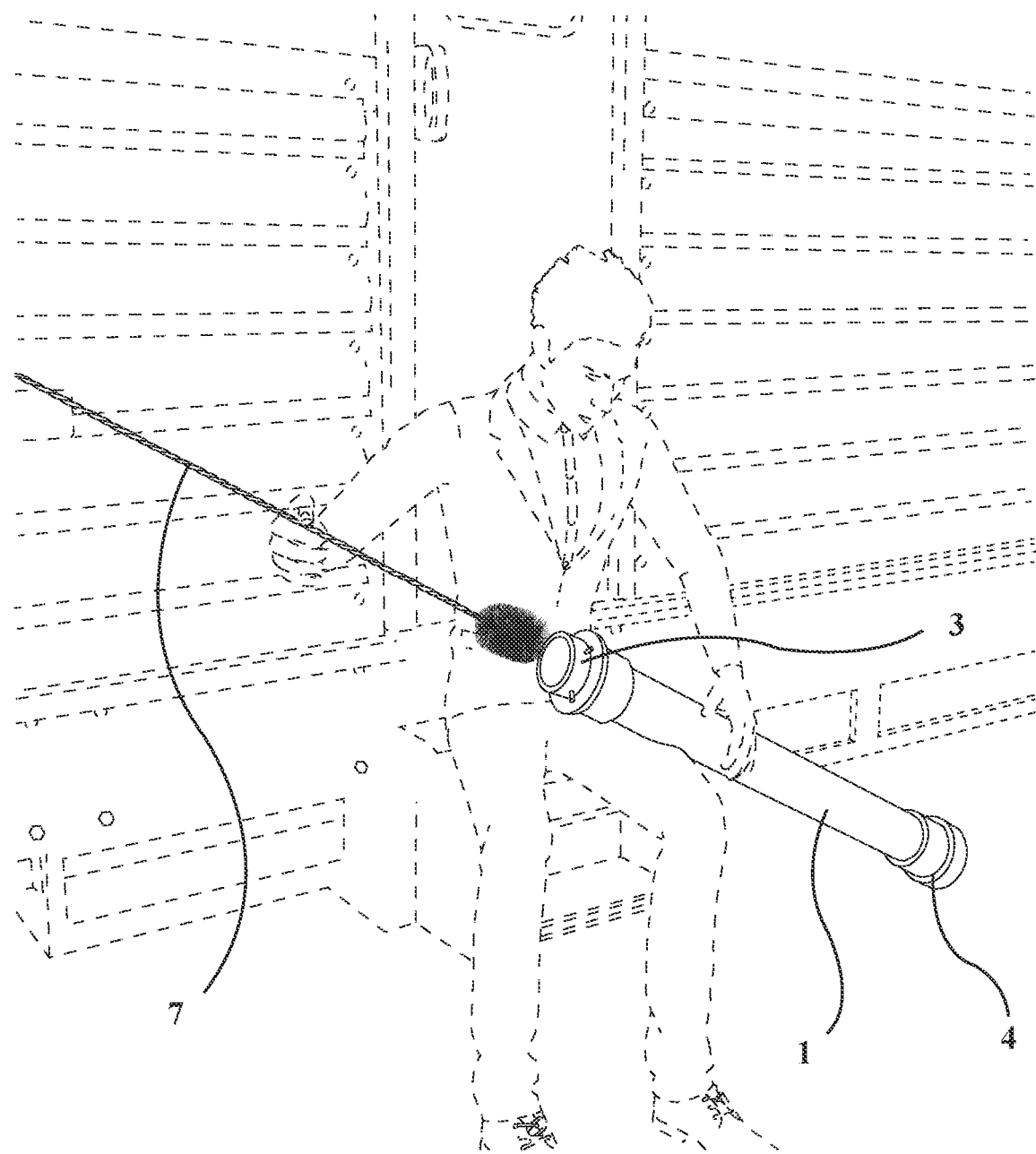
FIG. 4 is a perspective view illustrating brush cleaning of the rv waste management system according to an embodiment of the present invention of FIG. 1.
Figure 5:
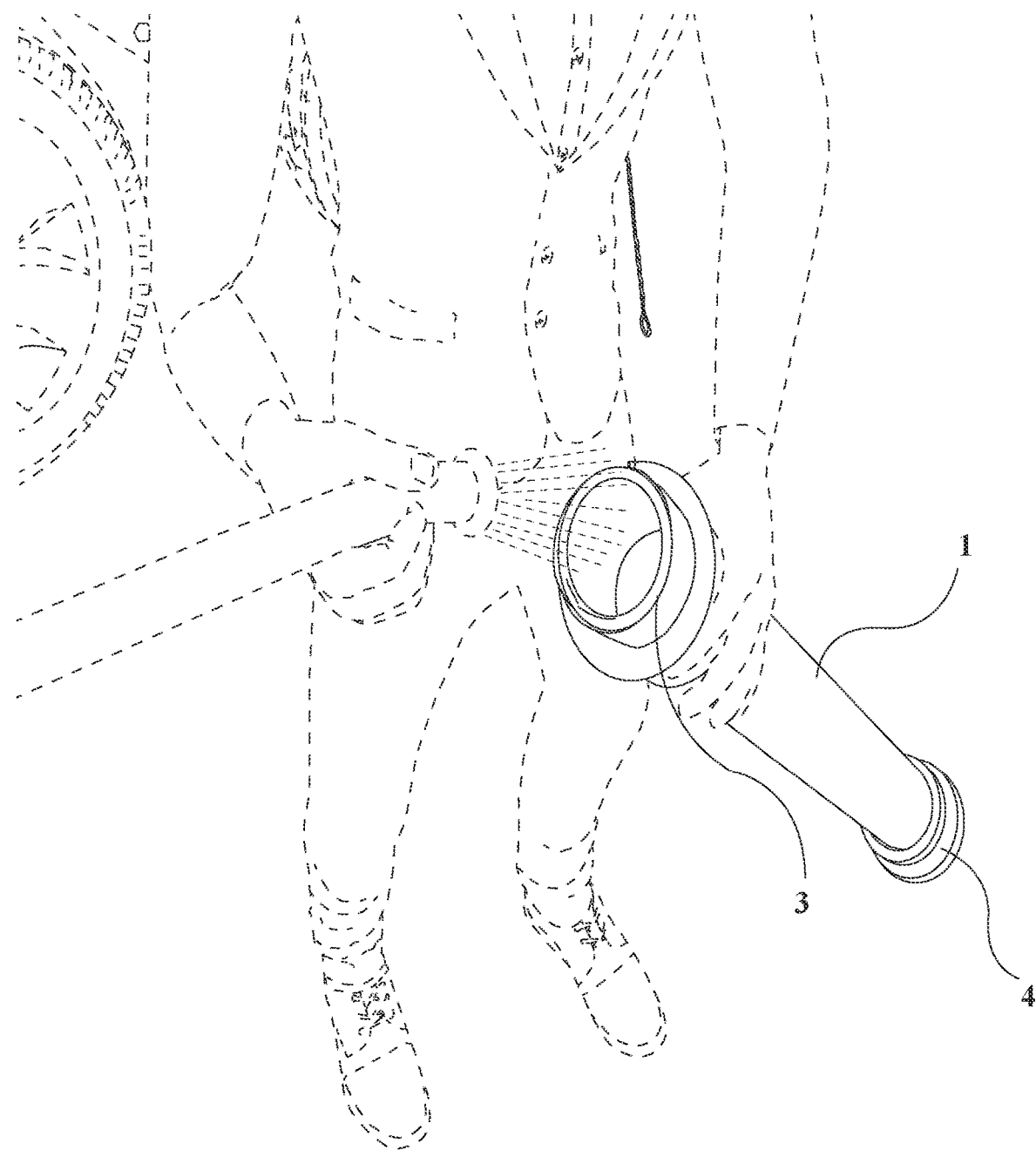
FIG. 5 is a perspective view illustrating a user cleaning (rinsing) components of the rv waste management system with water according to an embodiment of the present invention of FIGS. 1-4.

Referring to the drawings by numerals of reference there is shown in FIG. 1, an rv waste management system in an in-use condition according to an embodiment of the present invention with the following components: rigid pipe 1 comprises a hard elongated pipe of the rv waste management system; flexible pipe 2 allows the present system to bend around bushes, corners or other obstacles; male connector 3 links/locks the pipes together via the female connector; female connector 4 locks with the male connector 3 to link the present system; 90 degree elbow drain pipe 5 bends 90 degrees and connects to the sewer access pipe; support stand 6 may be used to provide support to the rv waste management system; and cleaning brush 7 comprises a long brush that is the standard cleaning brush for the present system, as shown in FIG. 4. The various components may be rinsed, as shown in FIG. 5, to promote longevity in use as well as to clean for safe and clean (not foul smelling) restorage. The various components may comprise a kit that is able to be sold to and used by rv users. The in-use condition(s) may take various forms of modular assembly as indicated in the FIGS. 1-3.

Figure 2:
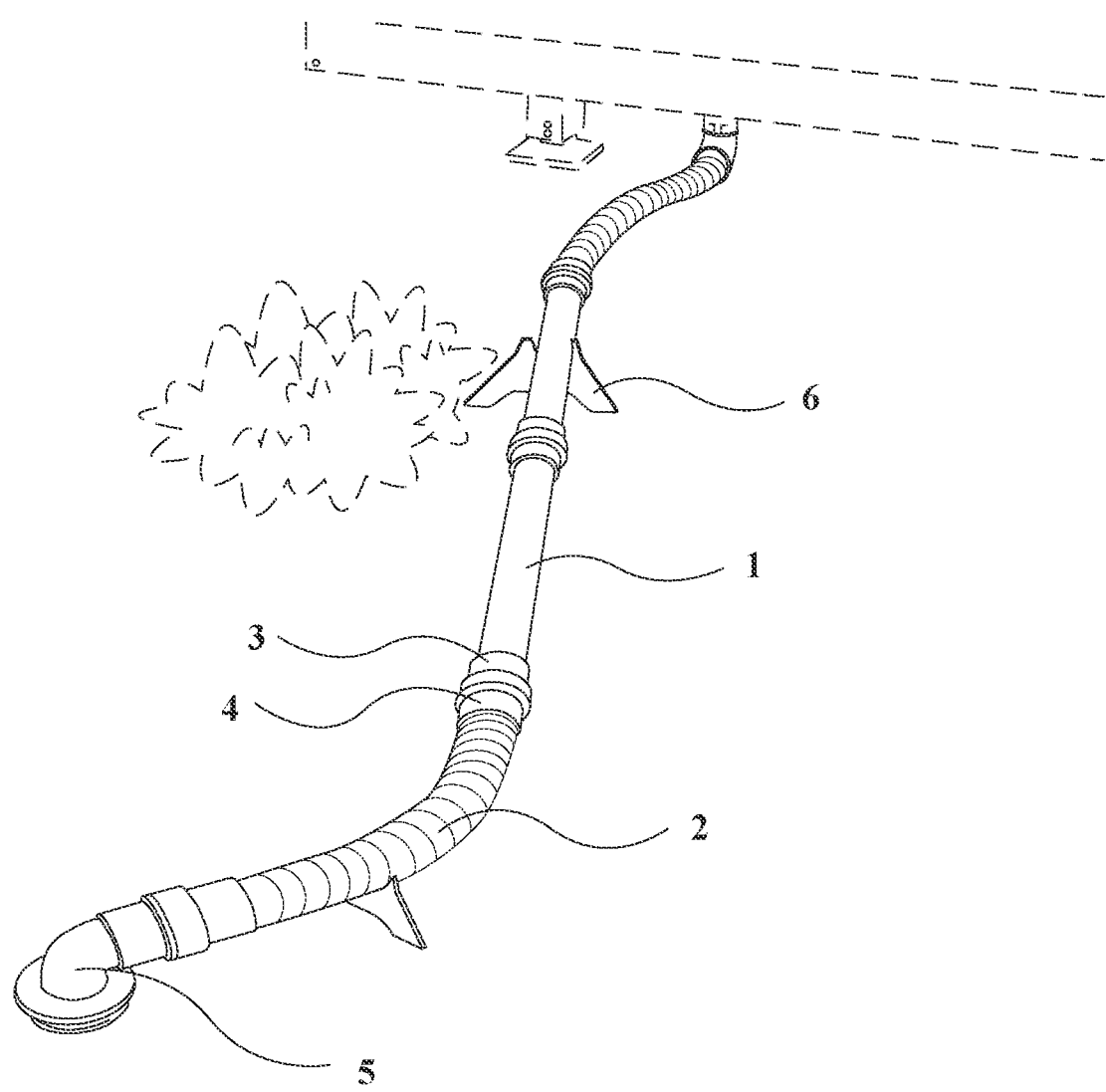
FIG. 2 is a perspective view illustrating the rv waste management system in another in-use condition (modular configuration) according to an embodiment of the present invention of FIG. 1.

FIG. 2 is a perspective view illustrating the rv waste management system in another in-use condition (modular configuration) according to an embodiment of the present invention of FIG. 1.

The recreational vehicle waste delivery system in the present embodiment may comprise: at least one length of 3D cylindrical non-flexible tube (rigid pipe 1) and at least one length of 3D cylindrical flexible-tube (flexible pipe 2) each having a body defined by an outer surface, an inner volume, an inner surface, and a tube-thickness, a first-coupler and; a second-coupler. The first coupler, the at least one non-flexible-tube (rigid pipe 1), the second-coupler and the at least one flexible-tube (flexible pipe 2) are able to be removably couplable modularly in series to provide an adjustable, modular waste management system for delivering waste from an rv to an in-ground sewer connection (via 90 degree elbow drain pipe 5) when engaged at the other end with a disposal fitting of the rv; and wherein both of the first-coupler and the second-coupler do not comprise bayonet-style-couplers.

FIG. 3 is a perspective view illustrating the rv waste management system in an yet another in-use condition (modular configuration) according to an embodiment of the present invention of FIG. 1.

Referring now to the first-coupler and the second-coupler they each preferably comprise threads. The inner surface of the 3D cylindrical non-flexible tube (rigid pipe 1) comprises a straight-wall; wherein the inner surface is non-accordian-walled. Certain embodiments may have coils within the tube wall of the flexible pipe 2 but minimally affect the flow and other versions may have exterior rings. The inner surface of both the rigid pipe 1 and the flexible pipe 2 comprise a smooth-wall to minimize friction on flow. The first-coupler and the second-coupler of the recreational vehicle waste delivery system comprise threads and function as threaded connectors for connection within the system and to the rv and to the in-ground sewer connection (or other sewer connection). As designed, the first-coupler and the second-coupler are able to effectively form a 360 degree water-tight seal in use.

The at least one length of 3D cylindrical non-flexible tube (rigid pipe 1) and the at least one flexible-tube (flexible pipe 2) are non-telescopic. The at least one length of 3D cylindrical non-flexible tube (rigid pipe 1) and the at least one flexible-tube (flexible pipe 2) preferably are about 3 inches in diameter in certain embodiments and the at least one length of 3D cylindrical non-flexible tube (rigid pipe 1) and the at least one flexible-tube (flexible pipe 2) are about 4 inches in diameter in other embodiments. Other sizes may be available. The at least one length of 3D cylindrical non-flexible tube (rigid pipe 1) and the at least one flexible-tube (flexible pipe 2) preferably comprise PVC, ABS, and Polypropylene material and withstand UV, freezing and heating as per current ASTM and CISPI standards. Other suitably equivalent materials may be used including but not limited to composites, other plastics and non-plastics and the like. As designed, the at least one flexible-tube (flexible pipe 2), as previously mentioned, is able to turn 180-degrees when bent and maintain the desired positioning during use.

Certain embodiments of the recreational vehicle waste delivery system may comprise the first-coupler and the second-coupler having non-threaded attaching means such as clips for example, however threading is preferred since the sealing capability is drastically improved over current systems.

In preferred embodiments of the recreational vehicle waste delivery system the second-coupler comprises a 90-degree elbow (90 degree elbow drain pipe 5) so as to easily attach to existing in-ground sewer connection(s) found in most campgrounds and parks. Other angles are envisioned, as needed, and should be considered to be embodied and enabled by the present disclosure and thus within the scope of the present invention. The first-coupler preferably comprises female-threads (female connector 4) and may alternately comprise male-threads. The second-coupler preferably comprises male-threads (male connector 3) and alternately comprises female-threads.

FIG. 4 is a perspective view illustrating brush cleaning using the cleaning brush 7 of the rv waste management system and FIG. 5 is a perspective view illustrating a user cleaning (rinsing) components of the rv waste management system with water, both FIGS. 4 and 5 according to an embodiment of the present invention of FIGS. 1-3. Using the brushing and rinsing protects the present invention and removes any residue and odor for travel storage. The components should be dried before packing.

The rv waste management system may be sold as a kit comprising the following parts: at least one length of 3D cylindrical non-flexible tube (rigid pipe 1); at least one length of 3D cylindrical flexible-tube (flexible pipe 2) (typically there will be a plurality of both non-flexible and flexible tube pipes); a carrying box (tote-style with a openable rotating lid that can be fastened/locked); at least one grid framework for inside the carrying box to set the pipes and components upon for rattle-free storage during travel (also reducing any wear on the components and providing breathing room for the components); at least one cleaning brush 7; and at least one set of user instructions. The kit has instructions such that functional relationships are detailed in relation to the structure of the invention (such that the invention can be used, maintained, or the like in a preferred manner). The rv waste management system may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, stands, mounts, customized parts, different color combinations, parts may be sold separately, etc., may be sufficient.

A method of using a recreational vehicle waste delivery system may comprise the steps of: step one providing the recreational vehicle waste delivery system as a kit comprising: at least one length of 3D cylindrical non-flexible tube and at least one length of 3D cylindrical flexible-tube each having a body defined by an outer surface, an inner volume, an inner surface, and a tube-thickness, at least a first-coupler and at least a second-coupler, wherein the first coupler, the at least one flexible-tube, the second-coupler and the at least one flexible-tube are able to be removably couplable modularly in series to provide an adjustable, modular waste management system, as described above, for delivering waste from an RV to an in-ground sewer connection when engaged with a disposal fitting of the RV. As previously mentioned, both of the first-coupler and the second-coupler do not comprise bayonet-style-couplers. Step two may comprise assembling and connecting the modular waste management system for delivering waste from the rv to the in-ground sewer connection when engaged with the disposal fitting of the rv, and step three manipulating orientation of the modular waste management system to fit existing outdoor terrain and available connections via user-preferred adjustment; the at least one length of 3D cylindrical non-flexible tube configured and sufficiently rigid to be mounted on at least one stand and the at least one length of 3D cylindrical flexible-tube configured to be formed to serviceably fit to and around the existing outdoor terrain and the available connections.

The method may further comprise the steps of: step four disassembling and cleaning the modular waste management system, components able to be cleaned via a cleaning brush that is 50 inches or less long; and step five storing, once dried, in a carrying box on a grid framework inside the carrying box.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A recreational vehicle (rv) waste delivery system kit comprising:
   at least one length of first and a second cylindrical non-flexible tubes and at least one length of first and second cylindrical flexible-tubes each having:
   a body defined by: an outer surface, an inner volume, an inner surface, and a tube-thickness; a first male coupler, and a second female coupler;
   wherein said first male coupler, said at least one length of first and second non-flexible-tubes, said second female coupler, and said at least one length of first and second cylindrical flexible tubes are able to be removably couplable modularly in series to provide an adjustable, modular waste management system for delivering fluid waste from an rv to an in-ground sewer connection when engaged with a disposal fitting of said rv;
   wherein both of said first male coupler and said second female coupler do not comprise bayonet-style-couplers;
   wherein said first male coupler and said second female coupler comprise threads and function as threaded connectors;
   wherein each first threaded male coupler and second threaded female coupler are able to effectively form a 360 degree water-tight seal in use;
   wherein said inner surface of said first and second cylindrical non-flexible tubes comprises a straight-wall;
   wherein said inner surface of each first and second cylindrical non-flexible tubes comprises a substantially smooth-wall to minimize friction on flow and so as not to accumulate said fluid waste along said inner surface;
   wherein said first and second at least one length of cylindrical non-flexible tubes and said first and second at least one length of flexible-tubes are non-telescopic;
   wherein said first and second at least one length of cylindrical non-flexible tubes and said first and second at least one length of flexible-tubes are at least 3 inches in diameter;
   wherein said first and second at least one length of cylindrical non-flexible tubes and said first and second at least one length of flexible-tubes comprise PVC, ABS, or Polypropylene material and withstand UV, freezing and heating;
   wherein said first and second at least one length of flexible-tubes are each able to turn 180-degrees when bent and maintain the desired positioning during said use; and
   wherein a user is able to manipulate said modular waste management system to fit an existing outdoor terrain and available connections via user-preferred adjustment,
   wherein the kit further comprises a 90 degree elbow drain pipe to connect to a sewer access pipe; a support stand; a carrying box; a grid framework for inside the carrying box; a cleaning brush; and a set of user instructions.

* * * * *